May 12, 1942.  E. J. HEFELE  2,282,402
AUTOMATIC RADIO DIRECTION INDICATOR SYSTEM
Filed April 27, 1937    4 Sheets-Sheet 1
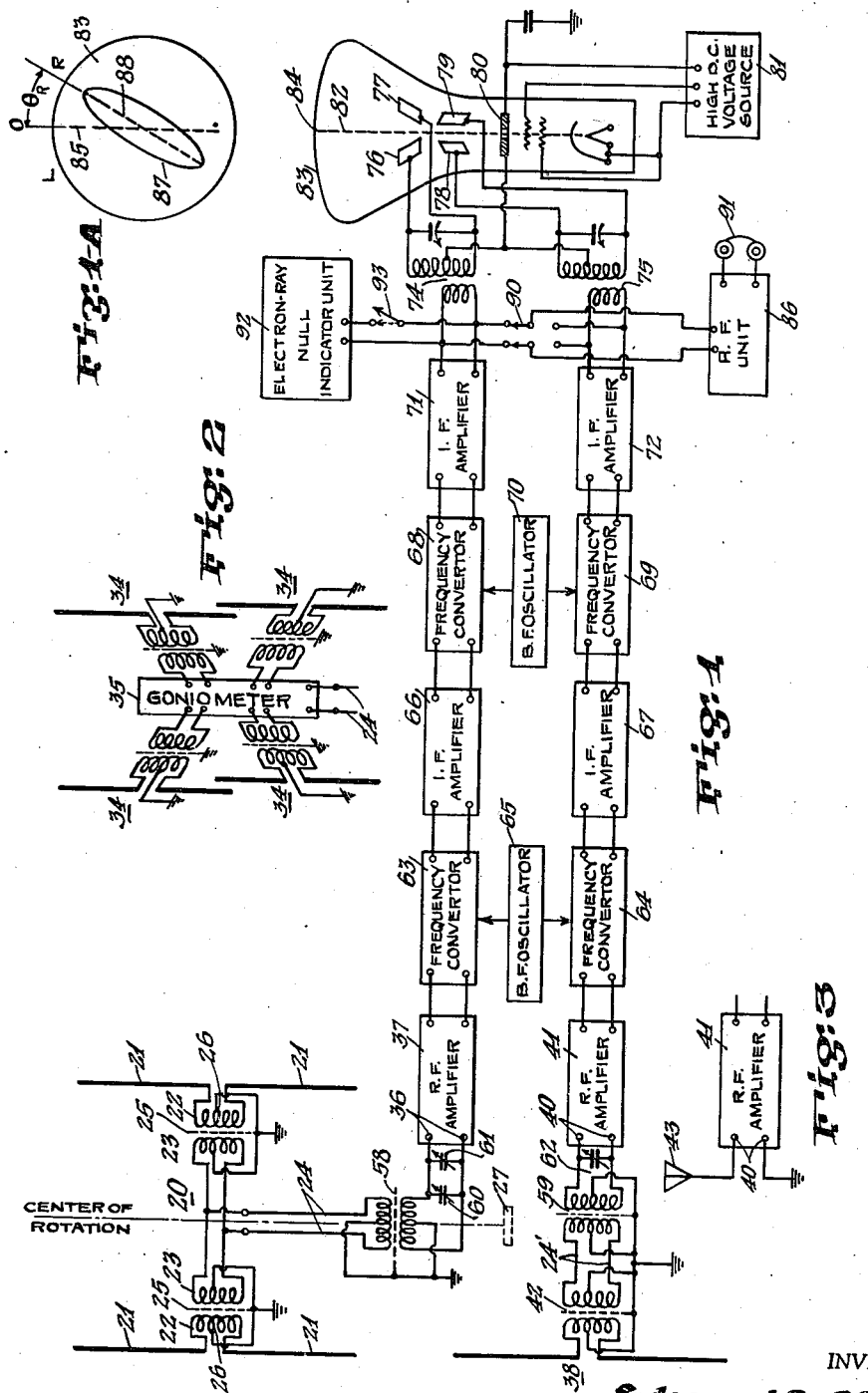
INVENTOR.
BY Edward J. Hefele
Samuel Ostrolenk
ATTORNEY.

May 12, 1942. E. J. HEFELE 2,282,402
AUTOMATIC RADIO DIRECTION INDICATOR SYSTEM
Filed April 27, 1937 4 Sheets-Sheet 2

INVENTOR.
Edward J. Hefele
BY Samuel Ostrolenk
ATTORNEY.

May 12, 1942. E. J. HEFELE 2,282,402
AUTOMATIC RADIO DIRECTION INDICATOR SYSTEM
Filed April 27, 1937 4 Sheets-Sheet 3

INVENTOR.
Edward J. Hefele
BY
ATTORNEY.

Patented May 12, 1942

2,282,402

UNITED STATES PATENT OFFICE 2,282,402

AUTOMATIC RADIO DIRECTION INDICATOR SYSTEM

Edward J. Hefele, Amityville, N. Y.

Application April 27, 1937, Serial No. 139,142

10 Claims. (Cl. 250—11)

My invention relates to radio direction finders, and more particularly, to that type of direction finder that automatically indicates the deviation in bearing to the right or left of the desired direction. This application is a continuation-in-part of my co-pending application Serial No. 43,189, filed October 2, 1935.

The determining factor in the directional characteristics of the usual direction finder using only a loop antenna is the orientation or angular position of the loop antenna with respect to the direction of the received signal. The null point is detected by a sharp demarcation between a decreasing and increasing signal reception according to the angular position of the loop. Accurately controlled frequency, amplification or other electrical conditions in the associated apparatus are unnecessary since they do not affect the accuracy of the indicated direction. Thus, the directional accuracy of solely loop antenna reception depends upon the geometry of the loop, i. e., the angular position of the loop and is unaffected by variations of the electrical constants.

In numerous situations, such as in aeroplanes, however, direction finders are insufficient due to the experimental work necessary in rotating the loop back and forth to find the null or maximum indications. For these cases, it has been proposed to use a right-left indicator, which is a system in which bearings are automatically ascertained.

In right-left indicators heretofore proposed, however, the readings depended upon constancy of the electrical conditions of the circuits, a factor which is impractical to obtain, and accordingly no commercially practical right-left indicator system has heretofore been developed.

An early attempt at imparting a right and left sense to the direction finder was to utilize two loop antennae placed at an angle to each other (usually 90°), two individually connected radio receivers, and a differentially connected indicating meter at the outputs. The normal figure-of-eight polar pattern defined the reception of each loop and associated amplifier independently. When the loops were in "on-course" position, equal signals are received by them and therefore equal outputs would be fed to the differentially connected output meter. This meter was connected so that the equal outputs produced equal and opposite deflecting torques upon the indicating needle, which resulted in a zero center or "on-course" reading. If the line of bearing was to either the right or left of the true radio bearing, one of the loop signals predominated and the receivers thus had unequal inputs applied to them from the loop antennae. There resulted unequal outputs to the indicating meter, producing a resulting indication which was either to the right or to the left of the zero center.

There are several disadvantages inherent in the two-loop system. The serious fault is that there are four directional "on-course" or null indications obtainable in the 360° rotation of the loops with respect to the transmitting source, resulting in a 90° bearing ambiguity. Moreover, there are many electrical constants which require continual corrections and balancing. Thus the over-all amplification or gain of the two radio receivers must be equal and so maintained. In practice, this can be accomplished for short intervals of time, and to maintain this equal gain requires repeated adjustments of the equipment. The design of the equipment must be such that the two loop antennae have equal effective electrical heights, equal inductance and tune to exactly the same signal frequency, necessitating a degree of precision in manufacture, and maintenance which makes such a direction finder a very expensive precision instrument and commercially impractical. A slight misadjustment in either loop circuit results in errors where null indications occur when the station is off-course by as much as six or seven degrees. Tests have shown that such equipment is entirely unreliable under normal operating conditions on the ground, on shipboard or in an aircraft.

The next development in the art was to remove a major disadvantage by utilizing only one radio receiver. The components of such a system also consisted of two loop antennae placed at an angle with respect to each other, a single radio receiver, a differentially connected indicating meter, and a switching device which alternately connected either loop to the radio receiver and at the same time switched the corresponding terminals of the indicating meter to the output of the radio receiver. The necessity of maintaining the sensitivity and tuning of two radio receivers equal was thus entirely removed. Various switching schemes were tried but it was found that mechanical switching introduced transient voltages at the radio receiver which resulted in erratic operation. Electronic switching was then developed to avoid the objectionable transients. However, bearing inaccuracies resulting from slight misadjustments in either loop antenna circuit, together with the disadvantages of a 90° bearing ambiguity, make such right-left indicator systems impractical, especially for aircraft use where the radio guide must be foolproof and absolutely reliable.

More recent developments depart from the two loop principle and utilize but a single loop. They consist essentially of a loop antenna, a vertical antenna, an electronic switching mechanism, a radio receiver and a differentially indicating meter. The loop antenna and the vertical antenna are alternately connected to produce a cardioid polar pattern of reception with the null direction pointing alternately towards the right and left of the direction of flight. The switching mechanism is arranged to alternately apply such right and left hand cardioid reception patterns to the radio receiver. An "on-course" bearing produces equal signal inputs to the receiver, so that there is a resultant zero torque on the needle of the differentially connected indicating meter. The double cardioid system is a great improvement over previous types of right and left indicating direction finders. A much greater percentage of the effective height of the loop antenna is utilized, resulting in a higher signal to static noise ratio which permits bearings to be taken when the null type direction finder would not be usable. The 180° bearing ambiguity is eliminated since when the aircraft is receding from instead of approaching the radio transmitter, the right-left sense indication becomes reversed. Only one loop antenna is employed, reducing the loop system aero-dynamic resistance by approximately fifty per cent. Several serious disadvantages nevertheless make this direction finder extremely unreliable. Where it is the sole navigational instrument, as is often the case when an aircraft is flying through fog, this unreliability is dangerous because of the fact that the indicating meter will continue to indicate right and left even though the bearing may be in serious error, with no way for the operator to test for or realize the error.

In the practical application of this double cardioid system, adjustments must be made very often even with the most carefully designed equipment. A tuned loop circuit and an aperiodic vertical antenna circuit with resistance phasing is generally used to produce the required cardioid polar reception patterns since this combination is most satisfactory from the standpoint of sensitivity with the use of the present radio receivers. This most advantageous antenna combination is the source of the serious errors mentioned, for the following reasons: In order to produce the required cardioids, it is necessary to have properly phased loop and vertical antenna circuits. In operation, the loop must be exactly in resonance with the signal frequency and be exactly in tune with an extremely selective receiver. An extreme degree of frequency stability is thus required in the receiver, particularly in the antenna stage thereof, and it must therefore not be altered from the predetermined design. Temperature control of the radio receiver circuits has been tried. However, it should be noted that the loop is mounted in the open air, which in itself removes any advantages due to receiver temperature control. This is particularly true in aircraft where changes as great as 2° F. per minute may occur, which act to change the electrical tuning characteristics of the loop and therefore the combined cardioid input circuit.

From the above it will be noted that in the prior right and left indicators, where two loops, or a loop and a vertical antenna are used, the operation depends upon a comparison of the relative signal pick-up of one loop antenna and the pick-up of either another loop or vertical antenna. A comparison of signal strengths, either arithmetically or by ratio, depends upon the absolute values of the resultant signal intensities. These intensities in turn are dependent upon electrical circuit conditions such as signal pick-up of the loop, the tuning of the loop circuit, the gain of the amplifier, etc. Since these electrical conditions are continually varying in any practical application, all right and left indicators of the prior art have been unreliable, particularly for aircraft use.

Summarizing, the single loop direction finder is reasonably accurate because it depends solely upon the geometric or angular position of the loop. The right-left indicators heretofore known, on the other hand, are inaccurate because they depend not only upon the angular position of a loop but also upon uncontrollable critical electrical parameters. These critical electrical variables may be adjusted accurately at a single frequency and for a given set of temperature humidity and electrical conditions, but when these critical adjustments change because of variations of the original conditions, large errors in directional accuracy result. A more serious disadvantage is that the operator is not apprised that these changes in the electrical constants have occurred so that he may make adjustments, but instead must blindly rely on their correctness.

In the double cardioid electronically switched system, if the loop is mistuned by as little as one per cent, a three or four degree error results at the indicator, since the indication obtained depends upon a comparison of the signal pick-up of the loop with the signal pick-up of the vertical antenna. A two per cent mistuning error, which is a very likely practical tuning variation, will produce an indicated deviation from normal to such an extent that although the ship may be on its proper course, there will be indicated a wide off-course direction. In such cardioid systems employing a loop, misphasing or mistuning of the loop produces an imperfect cardioid leading to erroneous indications, and there is no way for the operator to detect or correct this condition.

In general, my invention contemplates a right-left direction indicating system in which signals from a directional and non-directional antenna are independently amplified and combined at the indicator at a physical angle with respect to each other. I employ the non-directionally received signals as a reference voltage or condition. The directionally received signals are, in my preferred embodiment, impressed simultaneously upon the indicator with the non-directional signals and the resultant indication will deflect to the right or left of the null in accordance with the geometric angular position of the loop with respect to the direction of the received signals. The nor directionally received signals are employed as a time phase and sense reference voltage for direct combination and comparison at the indicator. By avoiding the combining of the directional and non-directional signals at the antenna stage where the hereinabove described electrical misphasing effects occur, to produce an indication thereof, I independently amplify these signals in accordance with my present invention and combine them at the indicator to produce a right or left indication in accordance with the loop signal conditions.

In my co-pending application hereinabove referred to, I describe the use of a cathode ray oscillograph as the indicator where the two independently amplified antenna signals are impressed. The non-directional signals produce a vertical line fluorescent image on the oscillograph screen, which vertical line is the null reference indication. Directionally received signals deflect the vertical indication to the right or left in accordance with the magnitude and sense (right or left) of the directional signals. When the directional signals are out-of-phase with respect to the non-directional or reference signals, the line image widens to form an ellipse, which ellipse is nevertheless properly deflected to the right or left without affecting the accuracy of the right-left indication. By simply adjusting the tuning of the directional receiver, the directional signals are readily brought into phase to produce a straight line indication on the screen.

The indications automatically deflect to the right or left of the null or central indication as the direction of the received signals is to the right or left of the geometric null position of the directional antenna. The degree of deflection of the indication is proportional to the inclination of the received radio waves with respect to the directional antenna. No bearing ambiguity exists since, with my present invention, a reverse right and left indication occurs when a reciprocal or rearward signal is received, as thoroughly explained in my co-pending application.

In aircraft applications of radio directional systems, it is desirable to reduce to a minimum the electrical disturbances due to static generated during flight through rain, snow, sleet and storms. A loop antenna may be very well shielded from the effects of such static by provision of a metallic shield which is grounded. However, it has heretofore been impractical to shield a vertical mast trailing wire or a non-directional antenna in such manner since these are employed at relatively high impedance input circuits and a grounded shield would destroy their pick-up. In accordance with my present invention, I provide a suitable shielded wire antenna, which shield intercepts the rain, snow or sleet, etc. static and transmits their effect to ground through a high impedance, and the enclosed antenna wire is substantially freed from the erratic static pulses. Such a shield is placed at high radio frequency impedance with respect to ground, and the signal pick-up of the enclosed antenna wire is substantially freed from the erratic static impulses.

A further method of minimizing static effects on the indications of radio directional systems and more specifically on automatic right-left indicators resides in substituting a loop antenna for the non-directional antenna. By employing two coaxial loops electrostatically shielded, and orienting one with its plane in the direction of flight, and the other transverse to the flight direction, accurate bearings free of static effects are obtained.

Blind landing systems employing marker beacons make use of ultra high frequency signals transmitted substantially vertically above predetermined points of the landing field. I provide means for visually indicating when the aircraft is within the field of the marker beacon signals using the cathode ray indicator of the right-left indicating direction finder. Such a system is a composite indicator which shows when the aircraft passes through the marker beacon and indicates directional sense to the directional beacons.

In accordance with my present invention, I also provide electro-mechanical indicators which are rugged and require no auxiliary power supply to operate as does the cathode-ray tube. The electro-mechanical indicator is provided with a needle pointer preferably maintained at null or "on-course" position with the reference or non-directionally received signals. Such indicators are useful where a minimum of controls for the operator are preferred. Misphasing of the two impressed signals does not affect the indicator but somewhat reduces the sensitivity of indication as will be hereinafter described in more detail.

Where the directional antenna employed is a loop, signal errors commonly known as "night effect" are combined with the regular signal waves to produce a distorted pattern of directional reception by the loop. Such effects are due to the reflected skywaves which combine with the ground waves in a different plane of polarization to produce a resultant distorted reception pattern. Night-effect is predominant during the night hours for commercial wave lengths which are unaffected in the day time. For the ultra-short waves, for example above five megacycles, so-called night effect or erroneous directional patterns due to reflected sky-waves occur in the daytime as well, due to the predominance of the sky waves at the antenna. Accordingly, a loop antenna is impractical for accurate directional guidance on ultra-short waves, that is, above five megacycles, and is similarly undependable for night flight. Although the accuracy of the right and left indications of my present invention is unaffected by night effect signal components, I provide a novel directional antenna system which is free from night effect, in place of a loop antenna for my system. The directional antenna I prefer to use in my present invention is preferably composed of a plurality of doublet antennae, at which antennae the night effect signal components balance or cancel.

In a further modification of my present invention, I provide an auxiliary cathode or electron ray null indicator responsive to the directionally received signals to independently indicate the null reception condition of the directional antenna array. Such an indicator will produce a double check on the null indications of a right and left direction finder to add to the reliability of the system.

Where signals of relatively high percentage of modulation or even over-modulation are to be used for directional guidance, I prefer to use very sharply selective signals for my preferred indicating system to minimize the undulated effects of such high modulated signals. I prefer to employ a double or successive series of intermediate frequency conversion stages for a superheterodyne receiver whereby the high image or rejection frequency ratio at the antenna stage is maintained with a high intermediate frequency and the superior selectivity of a low intermediate frequency is also used to produce a resultant sharply selective output corresponding to the carrier frequency of the signals. The use of piezo-electric crystal tuned filters at the intermediate stages would further increase the selective properties of the indicator.

Where a cathode ray tube indicator is used in a right-left indicator in accordance with my invention, a relatively high voltage power supply is generally required, having a voltage of the order of 600 to 800 volts for a bright indication image. Such high voltage power supplies of the prior art were generally bulky structures having considerable weight. I have discovered a novel high voltage power supply which is more efficient and of light weight as compared to prior systems. My novel power supply employs an audio frequency oscillator, the output voltage of which is stepped up through a transformer and rectified to produce the resultant high voltage output for the cathode ray tube.

Accordingly, it is an object of my present invention to provide a novel right and left radio direction indicating system.

Another object of my present invention is to provide a novel right-left direction indicating system employing an electro-mechanical indicator producing right-left indications independent of any electrical misphasing or parameter of the system.

A further object of my invention is to provide a novel right and left radio direction indicating system employing antennae which are substantially independent of night effect and sky-wave reflections in ultra-short wave signalling.

Still a further object of my present invention is to provide a novel antenna system which is shielded from the effects of rain and storm static.

Another object of my present invention is to provide novel circuit arrangements for increasing the selectivity of the amplifiers particularly useful for radio direction finder systems.

Another object of my present invention is to provide an independent null indicator for improving the reliability of right-left direction finder systems.

Still a further object of my present invention is to provide a novel high voltage power supply of high efficiency and light weight.

These and further objects of my present invention will become apparent in the following description taken in connection with the drawings, in which:

Figure 1 is a schematic electrical diagram of a preferred arrangement of my present invention.

Figure 1A is a diagrammatic showing of a fluorescent image on a cathode ray tube indicator deflected to the right and ellipsoidal in form corresponding to misphased antenna input currents.

Figure 2 illustrates a modified form for a directional antenna employing stationary external parts and being free of night effect.

Figure 3 illustrates a modified arrangement for non-directional antenna input to my system.

Figure 12 is a schematic diagram of a two loop antenna system for the right-left indicator for minimizing static effects.

Figure 13 is a schematic diagram of a composite indicator for direction finding and marker beacon service.

Figure 14 shows how the composite indicator indicates a marker beacon signal.

Figure 4:
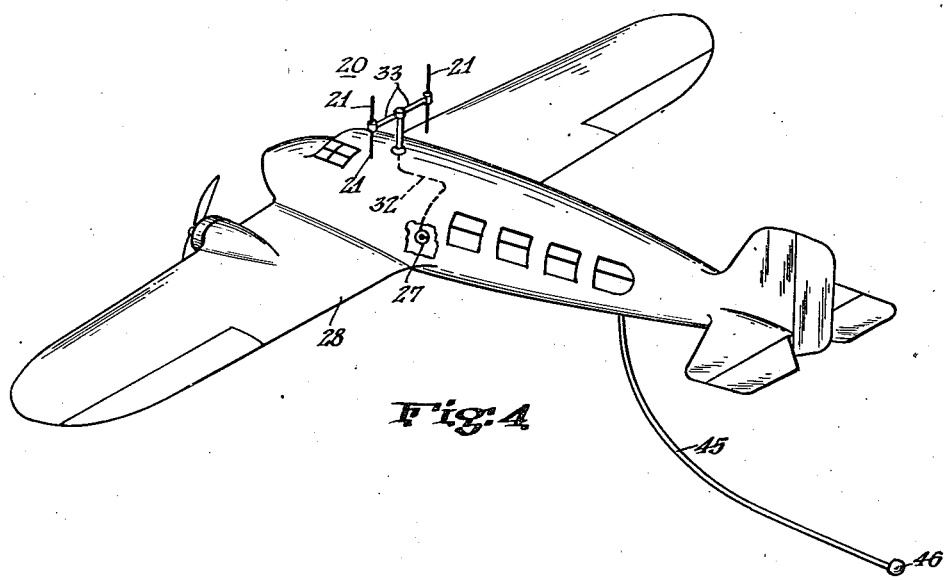
Figure 4 is a perspective illustration of an aircraft embodying a preferred rotatable directional antenna which is free of night effect, and my novel shielded directional antenna.

In Figure 1, I schematically illustrate a complete electrical circuit arrangement for a preferred right-left radio directional system employing a cathode ray tube indicator. The basic principle of this system is disclosed in my original and co-pending application Ser. No. 43,189 referred to above. This principle depends upon the independent reception and amplification of a directionally and non-directionally received antenna signal and their simultaneous combination at the indicator to produce an accurate right and left indication. For many practical applications, I prefer to employ the opposed doublet antenna system 20 to directionally receive radio signals. Each doublet consists of an upper and a lower vertical mast 21, the opposed portions of which are connected to opposite ends of a primary 22 of a radio frequency coupling coil. The secondary 23 of the coupling coil extends toward the central axis of the antenna array 20 and is combined in parallel to the balanced transmission line 24. I prefer to electrostatically shield the primaries 22 from the secondaries 23 of the radio frequency coupling coils by well known grounded shields 25. The center taps 26 of the primaries 22 and secondaries 23 are preferably connected to ground potential in order to electrically balance the doublets 21. The antenna array 20 is known in the directional antenna art as an Adcock antenna system.

The Adcock antenna array 20 employing the doublets 21 has a figure-of-eight reception pattern. The null reception characteristics of the antenna system 20 occurs perpendicular to the plane in which the doublets 21 lie. The polarization effects due to the reflected sky-waves and night effect are eliminated by this antenna array as well known in the art. In order to practicably employ the Adcock antenna array 20 for the right-left indicator, particularly upon an aircraft, I mount the directional antenna system 20 so as to be rotatable about its central portion as indicated by the dot-dash line. Accordingly, the directional system 20 instead of being rigidly mounted in position upon the aircraft as in prior applications of such an antenna array, is made rotatable and usable generally in a direction finder in place of a loop antenna, and not specifically as a "homing" system. A handwheel 27 is drawn in dotted at the center of rotation to indicate its control of the orientation of the antenna system 20.

In Figure 4 I have illustrated the antenna system 20 positioned upon an airplane 28 and arranged to be rotated. The vertical rods 21 are supported at the end of a rotatable structure 30 mounted upon a base 31 which is attached to the aircraft 28. The remote control hand wheel 27 connects to the antenna system 20 by a flexible cable 32 for adjustably positioning the antenna 20. The illustrated position of the antenna, with its plane positioned parallel to the axis of the aircraft wings 28 will produce null indication for signals coming from the front or rear of the plane. It is to be understood that the vertical rods 21 are insulated with respect to the supporting tubes 33. A mechanically simpler doublet antenna array which has an adjustable null position is illustrated in Figure 2. By using four doublets arranged in a square and corresponding to two sets of double antenna arrays 20 crossed at right angles, a goniometer comprising a rotatable coil may be used to pick-up the resultant directional figure-of-eight pattern by combining the individual doublets 34 in a well known manner. The goniometer coil (not shown) is enclosed at 35 and by rotating this coil, the null position of the reception pattern may be varied. The output of the goniometer is connected to the transmission line 24 connection leads which connect to the input 36 of the directional antenna radio frequency amplifier 37.

The non-directional antenna system may be of any preferred form. In Figure 1 I have illustrated a single doublet 38 similar to those already described and coupled to the input 40 of the non-directional radio frequency amplifier 41 by means of an antenna coupling coil 42. Figure 3 generally indicates a non-directional antenna 43 which may be used in place of the doublet array 38. For high frequency work, namely signals of the order of five megacycles, and greater, it is preferable to use the doublet antenna array. The over-all distance between the top and bottom of such a doublet antenna is of the order of a half-wave length and very efficient reception of such high frequency is possible with such a system. For similar reasons, the directional doublet antenna array described in connection with Figures 1 and 2 are preferable and efficient as compared to a loop antenna for such ultra-short wave frequencies.

The antenna arrays built up of the balanced doublet illustrated in Figures 1 and 2 are designed in accordance with the principles well known in the radio communications art. I have illustrated the primaries and secondaries of the coupling coils having their midpoints electrically grounded and with electrostatic shields between the primaries and secondaries. The interconnections between the plurality of doublets are made with balanced circuits and transmission lines to produce the predetermined reception pattern at the input of the radio frequency amplifier. Although I have illustrated the combination of a plurality of doublet antennae with electrically balanced circuits interconnecting them, I do not wish to be limited by this application to produce the rotatable directional reception patterns with the doublet antenna for a radio direction finder. Thus, by eliminating the bottom half of the doublets and retaining the top vertical masts, a similar combination of vertical masts is had to produce the figure-of-eight reception patterns. In this modification, it is preferable to ground the bottom ends of all the coupling coils instead of their mid-points.

In Figure 4, I illustrate a trailing wire 45 corresponding to the non-directional antennae 38 and 43 of Figures 1 and 3. The trailing antenna wire 45 is generally weighted at one end by a weight 46 and is let out from the aircraft for reception during flight. Prior single wire antenna are seriously affected by static produced by impact of the antenna with particles of rain, sleet, snow and dust when used on high speed aircraft.

It has been heretofore considered impractical to shield such an antenna from such static effects and by my present invention I provide a practical shielding therefor which greatly reduces the static and greatly increases the signal-to-static ratio of signals introduced by the shielded antenna wire to the radio receiver.

Figure 5:
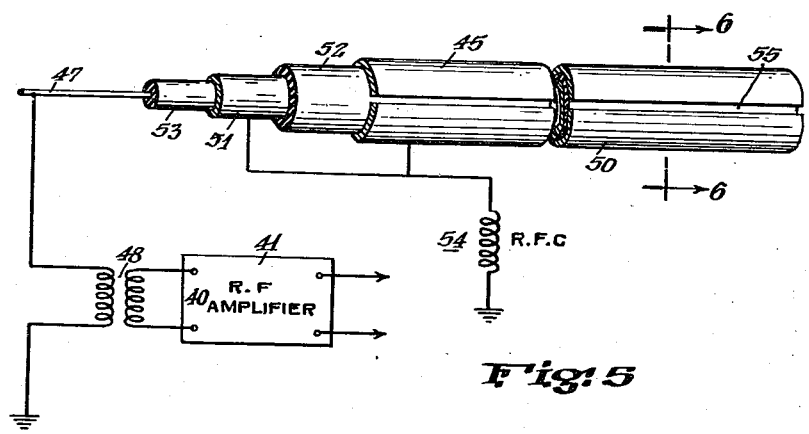
Figure 5 illustrates the construction and circuit connection of my novel shielded non-directional antenna with respect to the radio system.
Figure 6:
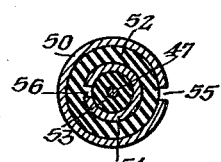
Figure 6 is a cross-sectional view taken along 6—6 of Figure 5 illustrating a preferred form for my novel static shielded antenna.
Figure 7:
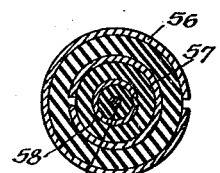
Figure 7 is a modification of the static shielded antenna corresponding to the cross-sectional view of Figure 6.

In Figure 5, I illustrate a preferred form of statically shielded wire antenna 45 and the electrical connections therefor. This antenna comprises a central antenna wire 47 connected to the primary of the antenna coupling coil 48 which is connected to the input 40 of the radio frequency amplifier 41. Two metallic layers 50 and 51 are arranged concentrically about the conductor 47 and preferably spaced and supported by alternate layers of insulation material 52 and 53. The anti-static trailing wire modification herein disclosed in connection with Figures 5, 6, and 7 is a modification of a similar application as applied to vertical mast antennae as disclosed in my co-pending application Serial No. 139,143, filed April 27, 1937, Patent No. 2,251,708, dated August 5, 1941. The electrostatic shields 50—51 are connected to ground potential through a radio frequency choke coil 54. The impact of the high velocity particles upon the outer shield 50 produces electrical currents which are conducted to ground through the high impedance choke coil 54. The interior shields are also connected to ground through the high impedance choke to minimize transient impulse excitation of the antenna input circuit.

Figures 6 and 7 are preferred arrangements for the concentric shielding for the antenna wire 47. Figure 6 consists of two concentric shields 50 and 51 having a portion of the circumference 55 slotted along its length to reduce signal losses due to eddy current effects in the shield 50. The inner shield 51 has a similar longitudinal slot at 56. In Figure 7, three concentric shields 56, 57 and 58 are arranged about the antenna conductor 47 having differently disposed slotted openings and electrically connected to ground through a radio frequency choke coil. The high impedance connection of the shields to ground permits the radio frequency signal to be efficiently picked up by the internal antenna conductor 47 and yet permits the dissipation and conduction to ground of the static generated by the high velocity atmospheric particles.

Referring again to Figure 1, the input 36 of radio frequency amplifier 37 is connected to the directional antenna 20. I prefer to employ a balanced transmission line 24 to couple the rotatable doublet antenna system 20 to the radio frequency amplifier 37. In order to maintain proper terminal impedance connections I employ a coupling transformer 58 at the end of the transmission line 24. The secondary of the coupling coil 58 is directly connected to the input 36 of the radio frequency amplifier 37. A tuning condenser 60 is shown connected in parallel across the secondary of transformer 58 for variably tuning the directional antenna system to the desired signals. A vernier condenser 61 is preferably connected in parallel across the main tuning condenser 60 to permit manual correction of the relative phase between the output signals impressed upon an indicator. The non-directionally received signals from antenna 38 are impressed upon the input 40 of the radio frequency amplifier 41. The doublet antenna system 38 is coupled to the transmission line 24' through an electrically balanced coupling transformer 42.

The end of the transmission line 24' is properly terminated by a transformer 59, the secondary of which is connected to the input 40 of the non-directional radio frequency amplifier 41. A tuning condenser 62 is connected in parallel across the secondary of the transformer 59 which tunes the non-directional antenna to the same received signals. A common tuning control for the whole receiver system employing a single mechanical connection is preferably used.

Although the output of the radio frequency amplifiers 37 and 41 may be impressed directly upon the indicator of my present invention, I prefer to employ more selective amplification than a radio frequency amplifier can practicably provide. In my co-pending application referred to above, I disclose a superheterodyne circuit employing a common beat frequency oscillator to produce identical intermediate frequency outputs for the two receivers. In Figure 1 is illustrated double intermediate frequency conversion. The outputs of radio frequency amplifiers 37 and 41 are respectively connected to the inputs of the frequency convertors 63 and 64 having a common beat frequency oscillator 65. The output of the frequency convertors 63 and 64 are respectively introduced to the intermediate frequency amplifiers 66 and 67 which further amplify the reduced frequency signals. I prefer to employ the conventional high image ratio rejection frequency for this first intermediate frequency conversion, namely a frequency of for example 465 kilocycles as the intermediate frequency at 66 and 67. The outputs of the intermediate frequency amplifiers 66 and 67 are respectively connected to the second frequency converters 68 and 69 having a further common beat frequency oscillator 70. The outputs of the frequency convertors 68 and 69 are respectively connected to intermediate frequency amplifiers 71 and 72. The frequency of the signals at amplifiers 71 and 72 are preferably of the order of 60 kilocycles, for example, 66 kilocycles. By employing such low intermediate frequency, much greater selectivity results to improve the indications at the cathode ray indicator 73 even for over-modulated conditions of the received signals.

The double frequency conversion should preferably be designed so that any harmonics of the beat frequency oscillator 70 or the resultant intermediate frequencies at 71 and 72 should not coincide with the intermediate frequency at amplifier 66 or 67 or the frequency of the oscillator 65. Thus, any tendency toward parasitic oscillation or regeneration between any of the stages is avoided and a very high gain system may be readily designed. Where a cathode ray indicator 73 is employed, it is preferable to use high voltage signals to obtain correspondingly larger indications on the screen of the tube.

The outputs of the second intermediate frequency amplifiers 71 and 72 are respectively connected to step-up transformers 74 and 75. The secondary of the step-up transformer 74 at the end of the amplifier train for the directionally received signals is connected to the horizontal deflecting plates 76 and 77 of the cathode ray tube 73. The secondary of the step-up transformer 75, at the end of the non-directional signal amplifier train, is connected across the vertical deflecting plates 78 and 79. The midpoints of the secondaries of the transformers 74 and 75 are preferably connected to the focusing anode 80 which is connected to the high voltage direct current source 81. Any conventional cathode ray tube may be used but intercoupling between the vertical and horizontal deflecting plates should be minimized as described in my copending application already referred to.

The electron beam 82 is focused upon the screen 83 of the cathode ray tube 73 to the central point 84 when no signals are impressed on the deflecting plates. When the non-directional signals from antenna 38 are amplified and impressed upon the vertical deflecting plates 78—79, a vertical line image 85 is produced on the screen 83 as shown in dotted in Figure 1A and corresponding to the 0 or null position of the indicator. The amplitude of the null indication 85 is adjustable by the degree of amplification of the non-directional amplifier train. The directionally received signals produce a signal component across the horizontal deflecting plates 76 and 77 of the identical frequency as the reference signal impressed across the plate 78—79. The combined effects of the horizontal and vertical signal components produce a resultant image upon the fluorescent screen 83 deflected to the right or left of the null position 85, the angle of the deflection being proportional to the amplitude of the non-directionally received signals. The deflectional sensitivity of the indication to the right or left of the null position depends upon the ratio of amplification between the directional and non-directional amplifier trains and may be suitably adjusted by the pilot in accordance with his immediate requirements.

The following mathematical analysis of my invention is presented to demonstrate the freedom of the indications from any electrical variations and misphasing. For simplicity, I shall neglect the modulation of the radio frequency carrier of the received radio signals, since the modulation of the carrier wave does not affect the indications because both the horizontal and vertical components of the applied oscillograph deflection voltages originate from the same signal and have substantially identical wave forms. I do not detect any audio frequency modulation for the operation of the right and left indications. However, detection of the audio frequency modulation is feasible without affecting the right and left indications. An audio frequency reception unit 86 may be connected to the output of the non-directional amplifier train through the double-pole, double-throw switch 90 at the intermediate frequency amplifier 72 to provide continuous aural reception from the transmitter to which the directional system is tuned. A separate aural reception receiver is therefore unnecessary which is a decided advantage in aircraft.

The voltage as amplified by the non-directional amplifier-train and as applied to the vertical deflecting plates 78—79 may accordingly be represented as $e_v = E_v \sin 2\pi ft$; where $E_v$ is the maximum value assumed by the voltage $e_v$, and $\sin 2\pi ft$ represents the sinusoidal nature of the signal of carrier frequency $f$ impressed upon the non-directional antenna 11. The signal picked up by the directional antenna 20 is amplified to a voltage $e_h$ and applied to the horizontal deflecting plates 76—77 of the oscillograph 73; where $e_h = E_h x \sin (2ft + A)$, $E_h$ is the maximum value that the sinusoidal voltage $e_h$ assumes, and $A$ represents the electrical time phase difference between the similar voltages $e_h$ and $e_v$ as applied to the plates of the cathode-ray tube.

The time phase difference A depends on the degree of mistuning of the loop. It is well known in the electronic art that if two similar voltages are applied to the two pairs of plates of a cathode-ray oscillograph, the resultant image is a straight line if these voltages are in phase of 180° out of phase. If a phase displacement exists between these voltages, the image becomes an ellipse. It is preferable to have an indication which is a straight line. I therefore provide a tuning adjustment to change the relative phase displacement of the directional antenna 20 voltage as applied to its amplifier 37 at input 36. The tuning vernier in my preferred embodiment is a variable condenser 61 connected across the tuning condenser 60. The operator manually adjusts the vernier 61 to cause the cathode-ray image to become a straight line.

Figure 1A shows a resultant fluorescent image 87 deflected at an angle $\theta_R$ to the right. The indication 87 is an ellipse being the result of a misphased condition between the two corresponding voltages and angle A of the equation. Although an accurate off-course indication is provided by the inclination of the axis 88 of the ellipse 87, it is particularly advantageous to maintain a straight line indication on the screen 83. Accordingly, the operator manually adjusts the vernier tuning capacity 61 or makes an equivalent adjustment until the value of angle A becomes 0 resulting in a straight line indication corresponding to the dotted axial line 88 on the indicator screen 83. When the indication is a straight line, the time phase difference A between the two component voltages is 0 and the directional signal output $e_h$ may be represented as $E_h \sin 2\pi ft$.

The value of the angle $\theta$ which the indication on the fluorescent screen 83 assumes, depends on the relative magnitudes of the effective values $E_h$ and $E_b$. The angle $\theta$ is equal to arctan $e_h/e_v =$ arctan $E_h/E_v$, and the resultant magnitude of the line of deflection is proportional to $$\sqrt{E_h^2 + E_v^2}$$

since these in-phase deflecting components are in quadrature. The quadrant of the deflection in this case towards R, is arbitrary and is preferably designed to correspond to a bearing to the right of the desired course when the directional antenna 20 is maintained in the on-course position.

A straight line image will be produced only when the voltages $e_h$ and $e_v$ are in phase or 180° out-of-phase. However, when the apparatus is once designed for the fluorescent image 26 to deflect towards the R quadrant when $e_h$ and $e_v$ are, for example, in-phase, this image will deflect towards the left or L quadrant, when the voltages $e_h$ and $e_v$ become 180° out-of-phase. Such a phase reversal occurs when the directional antenna passes through its null or on-course position. Furthermore, if the directional antenna is oriented in other than null, or the on-course of flight, the direction of the signal will be as indicated by the bearing or mechanical angular position of the directional antenna. The cathode ray indication will be a vertical line 85 for this directional antenna position. When the apparent direction is to the right, the image deviates towards the right or R, and similarly to L for a left indication.

Assuming that the pilot is flying radially towards a beacon or broadcasting station from which he is receiving a signal, then the directional antenna, with its null direction in the direction of the state will pick-up no energy. On the other hand, the vertical antenna voltage $e_v$ will be continuously impressed upon the cathode-ray tube indicator, and will produce a vertical line image on the screen corresponding to dotted line 85. If the pilot now is thrown from his course, so that the transmitting station is to the left of him, then the directional antenna will pick up energy, the magnitude of which is a function of the angle which the directional antenna makes with the direction of the incoming signal. The resultant between the magnitude of the non-directional antenna voltage $e_v$ and the magnitude of the directional antenna voltage $e_1$ produces an image 87 or 88 as in Figure 1A, deflected to the R quadrant. The pilot then knows that he is flying in a direction which is to the right of the transmitter. If the pilot further deflects to the right from his course, the magnitude of the signal picked-up by the directional antenna will increase, correspondingly increasing the horizontal component voltage $e_h$ on the cathode-ray indicator 73 and the resultant image deflection is then more to the right.

The pilot is thus automatically apprised that he is moving further off-course and towards the right of the transmitting station. On the other hand, if he rotates his aircraft so that it approaches the line of direction of the received signal, the signal impressed upon the directional antenna decreases in magnitude and the resultant fluorescent image approaches the vertical position 0. The pilot is then apprised of the fact that he is approaching the line of direction to the radio station and is again on-course when the indication is a vertical line. A similar consideration is involved when he is flying off course towards the left of the transmitting station, except that the directional antenna produces a signal 180° out of phase with that corresponding to that received when flying towards the right, and the image correspondingly deviates towards the left. We thus have normal or correct right and left indications when navigating towards a beacon. Such an indicator is extremely useful for "homing," i. e., flying to a destination transmitter by keeping the indicator image at "zero" or center.

In the case when the pilot is flying radially away or receding from the transmitting station instead of approaching it, then the directional antenna will again pick up no energy and a vertical image as 85 of Figure 1A will result. If now he is thrown to the right of the signal direction, the directional antenna will pick up some energy but since the orientation of the directional antenna is reversed or 180° from that condition hereinabove described, the horizontal component voltage $e_h$ will be 180° out of phase with respect to that received hereinbefore when thrown to the right and the image will have an inclination to the L instead of R quadrant. The pilot will therefore assume that he is heading to the left of the incoming signal and therefore will turn his aircraft towards the right in order to turn to the on-course direction. He thus turns his ship further to the right, increasing the magnitude of the resultant signal in the directional antenna and further increasing the deflection in the L quadrant. The pilot therefore will promptly realize that he is swerving further from instead of closer to his desired course, and is thus apprised of the fact that a reversed left and right indication is occurring, that he is flying on a reciprocal or reversed bearing and that the signal is coming from the rear rather than from the front of his ship.

The phase angle A between $e_h$ and $e_v$ may assume any value between 0° and + or — 90°. This can be seen by referring to the curves in the text "Radio Engineering" by Terman, page 49, Fig. 28, page 52, Figure 29, and page 54, Figure 30, and can occur by merely mistuning the loop circuit. However, it should be noted that a 180° phase reversal by mistuning is impossible because as seen from these curves, the phase angle corresponding to A which is equal to $2\pi fL/R$ can never even reach 90°. The small vernier tuning adjustment 61 in the directional antenna circuit provides means for properly phasing the directional antenna voltage $e_h$ with respect to the non-directional antenna voltage $e_v$ to the proper 0° or 180° phase relation. Since mistuning cannot produce a 180° phase reversal, the only possible condition for a straight line (when A equals 0) is to bring the directional antenna voltage phase to 0° or 180° to produce the proper right-left sense as designed for, dependent only upon the orientation of the directional antenna in the field of the signal. Thus, when the cathode-ray screen pattern is a straight line, the phasing has been properly adjusted irrespective of any previous conditions of mistuning. The component radio frequency stages of the non-directional and directional antenna amplifier trains produce a 180° reversal in phase of the voltage as the signal passes through each stage. This condition is taken care of by properly polarizing the directional antenna 20 with respect to the amplifier outputs to give normal or correct right and left indications on the oscillograph, which when once so designed, will not change.

The practical functioning of my invention is independent of any exact frequency tuning of the amplifier trains or of the directional antenna 20 by the common tuning control. Any mistuning, hence misphasing of the component signal voltages $e_h$ and $e_v$ produces an elliptic pattern on the screen 83 of the oscillograph 73 instead of a straight line image as hereinabove described. The pilot is thus immediately apprised of this mistuned condition, and adjusts the vernier control 61 to make the image on the screen 83 a straight line. When the pattern is a straight line, the phasing is correct, i. e., $e_v$ and $e_h$ are in phase or 180° out of phase. Hence when a vertical straight line indication appears upon the screen 83, the indicated bearing is accurate and independent of any mistuning or misphasing in the apparatus. Any variations in the over-all amplification of the signals due to practical changes of supply voltage or of other electrical parameters of the apparatus will merely change the height of the vertical line image 85 (Figure 1A) for any given input signal strength. The on-bearing indication of the vertical line image is always accurate as an indication, and its amplitude may be adjusted by a suitable receiver volume control.

By arranging the right and left doublet array, or equivalent half-doublets or single vertical masts so that one may be moved forwardly and the other rearwardly to change the angular position of the plane interconnecting the right and left masts, the null or zero reception angular position of the antenna system 20 may be made to vary from the axial position of the aircraft. Although the right and left mast may be rotated about its center axis, the forward and rearward motion of the masts along a line parallel to the axis of the plane would permit permanent stream-line shielding of the mast 21, and the minimum aerodynamic resistance will continuously remain in the direction of flight.

An important feature of my present invention resides in the combination with the right-left indicator of an independent null indication unit which is used to simultaneously check the null indications of the right-left indicator. The combination of a null indicator unit together with the right-left indicator permits fool-proof on-course flight with two null indications checking each other and the result is accurate since determination to the right or left is offered by the right-left indicator. In Figure 1, I illustrate the audio frequency unit 86 connected to the output of the directional amplifier train at the intermediate frequency amplifier 71 through the double-pole, double-throw switch 90. The audio frequency unit 86 contains a rectifier and audio frequency amplifier train which translates the audio frequency modulations of the received signals upon the ear phones 91. When the directional antenna 20 is on-course, null or zero audio frequency reception is received at the ear phones 91. The null reception at 91 is simultaneously accompanied by the vertical indication corresponding to 85 on the cathode ray tube screen 83. Signal reception from the right or left of the directional antenna array 20 will be heard at the ear phones 91 and will be seen as a right or left deflection on the fluorescent screen 83.

An alternative form for a null indicator unit in place of the audio frequency unit 91 is the electron-ray null indicator unit 92 shown connected to the output of the directional intermediate frequency amplifier 71 through the switch 93. The electron-ray null indicator 92 comprises a small electron beam impinging on a fluorescent screen and forming a shadow of width varying in accordance with the intensity of the signals impressed on the directional antenna 20. The voltage output from intermediate frequency amplifier 71 is rectified at the indicator unit 92 to a uni-directional current of amplitude varying in accordance with the directional signal intensity. The rectified current is used to variably bias the electron beam indicator tube to produce the indications. Complete circuit arrangements and details of such an electron beam tube null indicator system as connected to a directional antenna and amplifier is disclosed in my co-pending application Serial No. 107,209, filed October 23, 1936. Where an electron-ray null indicator unit 92 is employed in connection with the directional amplifier system, the aural reception unit 86 may be permanently connected across the non-directional amplifier train to provide continuous aural reception.

Figure 8:
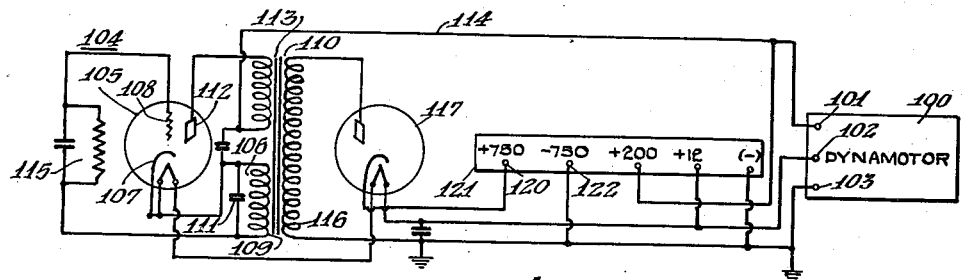
Figure 8 is a diagram of my novel high voltage supply.

The high voltage direct current source 81 used in the operation of the cathode ray tube indicator 73 may consist of any well known source such as batteries, dynamotors and the like. For operation of the system aboard an aircraft, such prior art power supplies are too bulky, heavy and inefficient in producing a 700 to 1000 volt source for operating the cathode ray tube. In Figure 8 I illustrate an electrical diagram of a preferred arrangement of an electronic high voltage direct current power source operable from an ordinary anode voltage source such as 200 volts. The dynamotor 100 supplies the normal anode voltage potential, for example, 200 volts, at terminal 101, the heater or filamentary voltage such as 12 volts at terminal 102, and a ground or negative terminal 103. An audio frequency oscillator 104 is used to generate a current of audio frequencies such as 1000 cycles. The audio frequency oscillator 104 comprises a triode 105 having a tank circuit 106 connected between its cathode and control electrode 108 to determine the generator frequency. The tank circuit 106 consists of a winding 109 on the transformer 110 connected in parallel with a condenser 111. The anode 112 of the oscillator tube 105 is connected to a second winding 113 of the transformer 110, coupled to the first winding 109. Lead 114 connects the anode potential of 200 volts from terminal 101 of the dynamotor 100 to the anode 112 through the winding 113. A grid leak and condenser 115 is shown connected in series with the grid of the oscillator.

The audio frequency current flowing through the audio frequency windings 109 and 113 of transformer 110 are stepped-up to a much higher voltage at the secondary 116 of the transformer. The audio frequency currents are then rectified to produce unidirectional currents of high frequency. I have illustrated a rectifier tube 117 comprising an anode 118 connected to one side of the secondary 116, and an indirectly heated cathode 119 connected to the high voltage terminal 120 of the terminal block 121. The negative high voltage terminal 122 is at the ground potential of the system connecting to terminal 103 of the dynamotor 100.

My novel combination of a local audio frequency oscillator and rectifier with a step-up transformer therebetween readily produces the necessary high voltage low current output required for the operation of the cathode ray tube, at voltages of the order of 700 to 1000 volts, and with an efficiency of conversion of thirty-five per cent. Prior power supplies operate at approximately five per cent efficiency or less for the small power output required to operate the cathode ray tube. A further important practical advantage of such a rectifier is that a saving in weight of approximately eighteen pounds is also obtained with such a high voltage uni-directional potential source.

Figure 9:
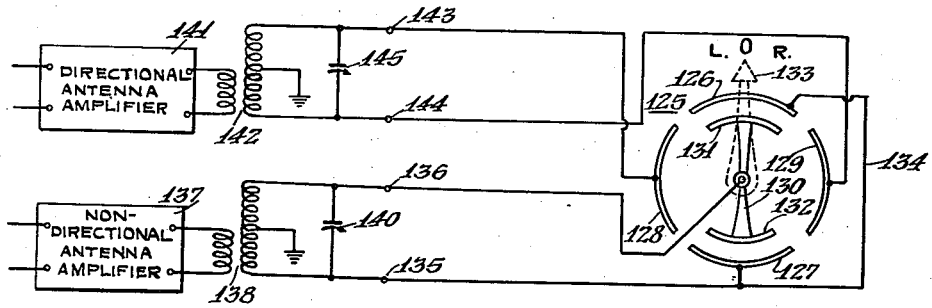
Figure 9 is a diagrammatic illustration of an electrostatic needle indicator to be used in place of the cathode ray tube indicator of my invention.
Figure 10:
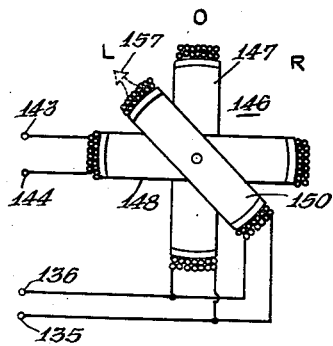
Figures 10 and 11 are further modifications of the electromechanical indicator operating on magnetic principles.
Figure 11:
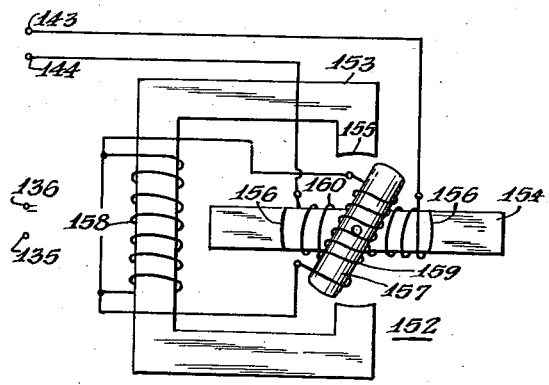
Figure 42:
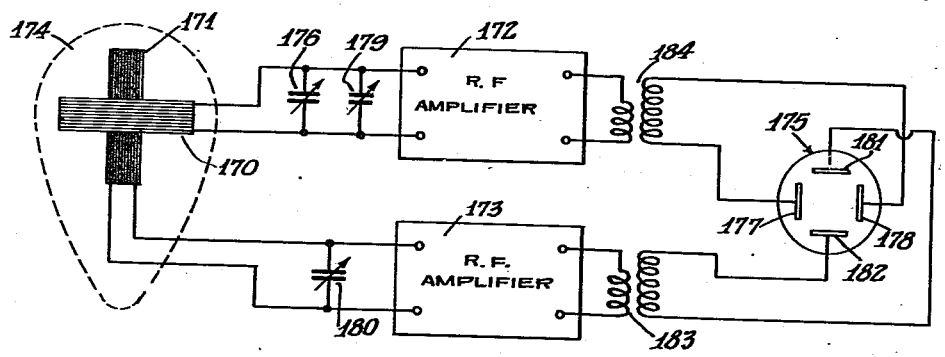
Figure 43:
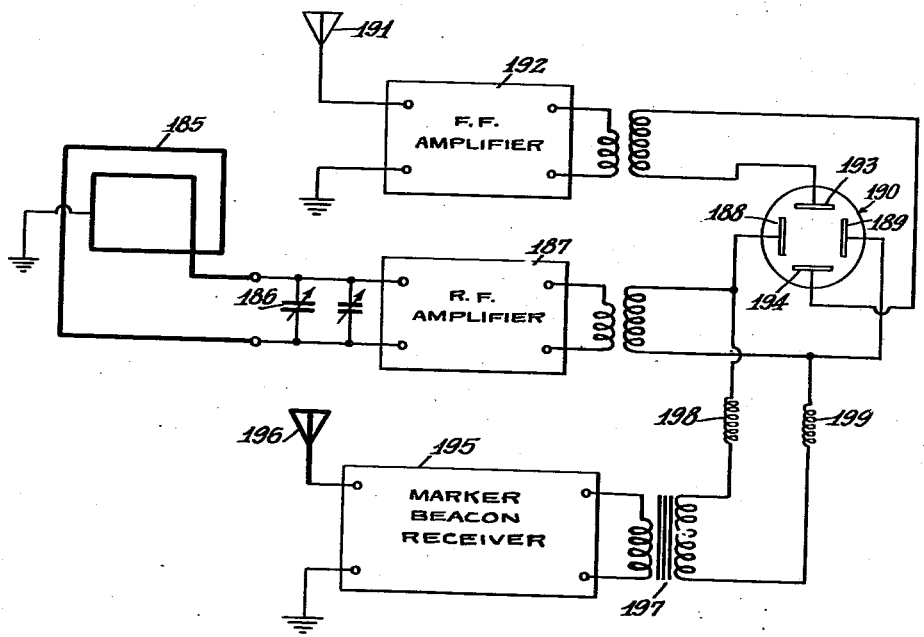
Figure 44:
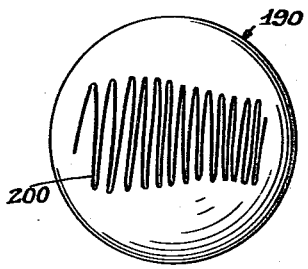

The principle upon which the right-left indicator of my present invention operates and, as already described in connection with Figure 1 and also my co-pending application Serial No. 43,189 is the production of a bearing indication by a right and left indicator by impressing upon the indicator the forces generated by the amplified electrical energy from a non-directional antenna system and a directional antenna system at a physical angle with respect to each other. The two forces operating at a physical angle with respect to each other deflect the indicator to the right and left in accordance with the relative magnitude and phase of the directional antenna signals with respect to the reference non-directional signals. My invention is not limited to a cathode ray tube or other electron beam indicator. In some applications it is advisable to employ a needle indicator which is rugged and requires no auxiliary power supply as does a cathode ray tube. In Figures 9, 10 and 11 I have illustrated electro-mechanical indicators connected to my system in place of the cathode ray tube and operating on the basic principle of my present invention.

In Figure 9 I have illustrated a needle indicator 125 operating on the electrostatic principle. The electrostatic indicator comprises four quadrants 126, 127, 128 and 129 circularly arranged about a movable or rotor portion 130 comprising two oppositely disposed electrostatic segments 131 and 132 of unequal size conductively connected together and arranged to rotate within and coact with the quadrant plates 126 to 129. The mechanical construction of the schematically indicated meter 125 is similar to established electrostatic meters. A pointer or needle 133 is shown in dotted lines as attached to the center of rotation of the rotatable member 130. The vertically arranged quadrants 126—127 are electrically connected together by connection 134 to one terminal 135 at the output of the non-directional antenna amplifier train. The rotatable or central member 130 including the segments 131 and 132 are electrically connected to the associated terminal 136 at the output of the non-directional antenna amplifier train.

The antenna system and associated amplifiers for the mechanical indicator of Figure 9 are similar to those described hereinabove and illustrated in Figure 1. The non-directional antenna amplifier shown at 137 represents the radio frequency or intermediate frequency output voltage from the non-directionally received signal input. A step-up transformer 138 is connected to the output of non-directional antenna amplifier 137. The secondary of the step-up transformer 138 connects to the vertical section input terminals 135—136 for the indicator 125. The mid-point of the secondary of transformer 138 is preferably grounded to electrically balance the output thereof. A condenser 140 is shown connected in parallel across the secondary of transformer 138 to tune it to the frequency of the signal input to the transmitter 125. Where two successive stages of frequency conversion are employed, a frequency of the order of 50,000 to 60,000 cycles may be used at the indicator 125. However, I do not wish to be limited by the order of the frequency input for the mechanical indicators, which frequency may be much lower or higher than the herein indicated frequency. The alternating current input to the mechanical indicators corresponds to the signal output of the antenna systems as will be evident.

The directional antenna amplifier shown at 141 represents the corresponding output from the directionally received signals at a frequency identical to the output of the amplifier shown at 137. A step-up transformer 142 connects the output of amplifier 141 to the horizontal section input terminals 143—144 of the indicator 125. A condenser 145 is connected across the secondary of transformer 142, the midpoint of which is grounded.

The alternating current voltage input to the vertical section at terminals 135—136 is of substantially uniform intensity. The rotatable member 130 will be attracted to the vertical position illustrated in response to such a signal input. Although the input is alternating current, the needle will be held in a vertical position since the stationary and rotor sections simultaneously vary in potential, producing a resultant torque to hold the needle 133 in a vertical or null reference position opposite 0. The variable or directional voltage at terminals 143—144 connecting to the horizontal stationary plates 128—129 produces a horizontal torque component upon the movable plates 131—132. The vertical torque position of the indicating needle 133 is not restrained by the use of springs so that the on-course or 0 indication is produced entirely by the physical force generated by the output of the non-directional antenna receiver. The electrostatic plates 128—129 are arranged so that their electrostatic field is produced at a physical angle with respect to that of the vertical field produced by the vertical plates 126—127, preferably at 90° as illustrated. Any voltage impressed upon the horizontal plates 128—129 by reason of the directional antenna system being off null position to the right, a resultant electrical field will be produced so that the plates 126 and 129 will have an instantaneous positive charge and plates 131 and 128 an instantaneous negative charge producing a resultant deflection to the right R. When the directional antenna is placed on the other side of null, electrostatic plates 126 and 128 will have an instantaneous positive charge and plates 131 and 129 will have an instantaneous negative charge by reason of the reversed instantaneous polarity of the second loop position with respect to the reference instantaneous polarity on the vertical plates, producing a resultant indication to the left L.

Such right and left operation will hold true for any relative time phase displacement between the outputs of the non-directional antenna and directional antenna receiver 137 and 141 respectively until such phase displacement is 90° resulting in a possibility of reversed sense but never the possibility of erroneous null indications. However, by proper receiver design, reversal of the sense indication can be readily avoided. It is emphasized that the on-course or null indications results when the directionally received signals are a minimum or zero so that the pilot can be reliably guided toward a transmitter. Any time phase difference between the directional and non-directional signals impressed at the indicator 125 merely results in a decreased deflectional sensitivity of the meter, the decreased sensitivity being proportional to the divergence of the phase or increased time phase difference.

I also employ a needle indicator operating on the electro-dynamometer principle to produce the right and left indications similar to the system disclosed in connection with Figure 9. The input terminals 135—136 to the vertical torque component section and the input terminals 143—144 to the horizontal torque component section correspond to the identically numeralled terminals of Figure 9. The electro-dynamometer indicator 146 comprises two stationary coils 147 and 148 preferably arranged at 90° with respect to each other and a rotatable coil 150 arranged to rotate within the stationary coils 147 and 148. A needle 151 is affixed to the movable coil 150. The non-directional signal input is connected to the vertical coil 147 and the rotatable coil 150 which coils are connected in parallel. When the directional signals are 0, the rotatable coil 150 will be aligned vertically by torque resulting from the physical force produced by the magnetic actions of the coils 147 and 150. The directional signals impressed upon the horizontal coil 148 produces a resultant magnetic field upon the movable coil 150 displacing it to the right or left of the zero or null position in accordance with the instantaneous phase relation between the reference signals impressed on the vertical coil 147, the magnitude of the deflection being proportional to the signal strength of the directionally received signals which in turn depend upon the angle between the direction of the received signals and the directional antenna position.

Figure 11 is a further modification of a magnetic needle indicator similar to the dynamometer 146 of Figure 10 but employing permanent magnet structures to increase the sensitivity of the indicator. The electromagnetic indicator 152 comprises two stationary magnetic material structures 153 and 154 arranged at right angles with respect to each other and having respective pole faces 155 and 156 arranged in a circle to cooperate with a movable magnetic structure 157 rotatable within the pole faces. The magnetic coils 158 and 159 of the vertical and rotatable magnet structure 153 and 157 respectively are connected in parallel across the non-directional signal terminals 135—136. The directionally received signals are impressed across the solenoid 160 of the horizontal magnet structure 154. The magnetic operation of indicator 152 is similar to that described in connection with indicator 146.

In Figure 12 I have diagrammatically indicated a preferred automatic right-left indicating system for minimizing the effects of static upon the indications. In this case, I employ two loop antennae 170 and 171 respectively connected to the inputs of radio frequency amplifiers 172 and 173. Loop antennae 170 and 171 are preferably co-axial and mechanically connected together at 90° with respect to each other as illustrated. The loop antennae 170 and 171 are rotatably mounted upon the aircraft in order to enable the pilot to take a null bearing in any direction. The antennae 170 and 171 are electrostatically shielded according to principles well known in the art so that they individually are free of or receive a minimum of electrostatic disturbances. The antennae 170 and 171 are proportioned as disclosed in my Patent No. 2,062,129 for enclosure within the streamlined housing 174 indicated in dotted line. The housing 174 is fixedly attached to the aircraft and is mounted with a minimum aerodynamic resistance in the direction of flight.

The illustrated position of the loop antennae 170 and 171 will produce a null or vertical line indication upon the cathode ray screen 175 for stations directly in line with the axis of the streamlined housing 174 and parallel with the plane of the loop 171 and perpendicular to the plane of the loop 170. The loop 170 corresponds to the directional antenna of the right-left indicator hereinabove described in connection with Figure 1 and also disclosed in my co-pending application Ser. No. 43,189. Antenna 170 is tuned to the signal frequency by variable condenser 176. The signals from loop antenna 170 are amplified by radio frequency amplifier 172, the output of which is directly connected to the horizontal plates 177—178 of the cathode ray tube indicator 175 by radio frequency transformer 184. The vernier variable condenser 179 is used for phasing control of the indication hereinabove described in connection with Figures 1 and 1a.

The loop antenna 171 is tuned to the common signal frequency for the system by variable condenser 180, the signals of which are amplified by radio frequency amplifier 173 and introduced to the vertical deflecting plates 181—182 of the cathode ray indicator 175 by radio frequency transformer 183. The loop antenna 171 operates in place of the non-directional antenna described in connection with Figures 1 and 3 hereinabove for the system. Although I have indicated simple radio frequency amplification for the signals, it is to be understood that frequency conversion to intermediate frequencies is feasible for the present modification.

A vertical line indication on indicator 175 will occur when the plane of the "horizontal" loop antenna 170 is perpendicular to the direction of the station so that a zero signal output will occur from the transformer 181 upon the horizontal deflecting plates 177—178. At this time, the vertical "loop" antenna 171 will receive a maximum signal intensity which is impressed upon the vertical deflecting plates 181—182. A vertical line indication corresponding to the dotted line 85 in Figure 1a will take place at this time to indicate an "on-course" indication corresponding to the position of the loops as will now be evident. For a right or left deviation with respect to the on-course position of the loops 170—171, corresponding right-left deflections will occur upon the indicator 175 in a manner described hereinabove, since the "horizontal" loop antenna 170 will receive signals and impress them upon the horizontal deflecting plates 177—178 with intensity varying in accordance with the angle from the perpendicular position to loop 170. Since antennae 170 and 171 are substantially free of static pulses from which they are shielded, the signals impressed upon amplifiers 172 and 173 as well as upon the cathode ray tube indicator 175 will not be influenced by such static conditions which occur in thunder storms and flights through rain, sleet, snow and the like.

The cathode ray tube indicator of my present invention may be advantageously employed as a composite indicator for both directional right-left determinations as well as marker beacons indicators for landing purposes. Several line landing systems have recently been commercialized employing ultra-high frequency signal communication between the landing field and the pilot about to land. Such systems are particularly useful for landing during fog, rain or snow conditions. Several directional ultra-high frequency transmitters are stationed along the landing field in the path of the landing direction and are arranged to transmit the ultra-high frequency signals in a vertical radiation pattern directly above the respective transmitters. Frequencies of the order of sixty megacycles are commonly used. The marker beacon receiver of the pilot is tuned to the particular frequency of the marker beacon signals and when the audio frequency modulation of the signals is apparent to the pilot, he knows that he is flying through the directionally radiated marker signals and that the airplane is located directly above the predetermined marker position. A flying technique employing two or more of such marker beacons is used to effect perfect "blind" landing.

In Figure 13 I have illustrated in simplified schematic form the operation of the cathode ray right-left indicator used as a composite indicator in conjunction with the marker beacons. The loop antenna 185 is tuned by condenser 186 to the transmitter for directional indication. Signals from loop 185 are passed through radio frequency amplifier 187 and are impressed upon the horizontal deflecting plates 188 of the cathode ray tube 190. Cathode ray tube 190 corresponds to the cathode ray tube 83 described in connection with Figure 1 and here merely schematically indicated. The non-directional antenna 191 is coupled to the radio frequency amplifier which is tuned to the same signals as directional antenna 185 and signals are impressed upon the vertical deflecting plates 193—194 of the cathode ray tube 190. The system of Figure 13 thus far described is similar to the automatic right-left indicator I describe in my co-pending application Ser. No. 43,189 and may also be any preferred modification other than straight radio frequency amplification shown here for simplicity. The system of Figure 1 of the present application for example may be used instead. The important feature of this modified form of the invention resides in the use of the marker beacon receiver 195 coupled to the antenna 196 and tuned to the predetermined marker beacon frequency for example sixty megacycles. The marker beacon signals are amplified and preferably demodulated so that the audio frequency modulation of the marker beacon signals are impressed upon the audio frequency transformer 197. The output of the audio frequency transformer 197 is connected to the horizontal deflecting plates 188—189 through radio frequency choke coils 198 and 199 connected in series with the secondary leads of transformer 197. The radio frequency choke coils 198 and 199 prevent the high frequency currents impressed upon the horizontal deflecting plates 188—189 from being short-circuited or being affected by the circuit connection of the marker beacon receiver or transformer.

The signals from marker beacon 195 when impressed upon the horizontal deflecting plates 188 and 189 cause the signals impressed upon the vertical deflecting plates 193—194 to literally "spread-out" for example as shown by the curve 200 upon the screen of the cathode ray tube 190 as shown in Figure 14. Such a spreading-out of the image upon the cathode ray screen clearly differentiates from the right and left directional indications and occurs even though the ship is on-course and receives no signals upon the directional antenna 185. As will now be evident, the continuously impressed signals by radio frequency amplifier 192 from the non-directional antenna 191 occur across the vertical deflecting plates 193—194. The output of the marker beacon receiver 195 is substantially zero except when its antenna 196 comes within the directionally radiated ultra-high frequency field corresponding to the marker beacon signals. At that instant, the output of the marker beacon receiver 195 will be impressed upon the horizontal deflecting plates 188—189 to cause a spread-out image upon the screen corresponding to the image 200 of Figure 14. Although I prefer to use the audio frequency modulation components of the marker beacon signals, it is equally feasible to use the ultra-high frequency signals directly upon the horizontal deflecting plates or employ any intermediate frequency corresponding to the marker beacon signals.

The composite indicator 190 operates normally as an automatic right-left indicator in accordance with the principles hereinabove described for my invention and the marker beacon receiver causes a characteristic distortion or spreading-out of the image and produces an indication which the pilot immediately knows corresponds to the marker beacon receiver signals. The marker beacon receiver 195 is generally disconnected during normal flight conditions and is connected in circuit before landing and the radio directional indicator 190 serves as the indicator for the marker beacon as will now be evident.

Although I have illustrated preferred embodiments for carrying out the principles of my present invention, it is to be understood that modifications thereof will be evident to those skilled in the art, and accordingly I do not intend to be limited except as set forth in the following claims.

I claim:

1. In a right-left indicating direction finding system, a non-directional antenna; a directional antenna; a radio frequency amplifier for each of said antennae; an electro-mechanical indicator having fixed members and unrestrained movable members; circuit connections from said radio frequency amplifiers to said fixed and to said movable members for applying radio frequency signals thereto; said movable and fixed members coacting on each other to produce a rotation of said movable member to indicate the relative values of the signals in said amplifiers when energy is being received from each of said antennae, and to maintain said movable member at its zero position when energy is received from said non-directional antenna and substantially no energy is received from said directional antenna.

2. In a right-left indicating direction finding system, a non-directional antenna; a directional antenna; a radio frequency amplifier for each of said antennae; an electrostatic indicator having fixed and movable members; circuit connections from said radio frequency amplifiers to said fixed and to said movable members for applying radio frequency signals thereto; said movable and fixed members coacting on each other to produce a rotation of said movable member to indicate the relative values of the signals in said amplifiers, said movable member being normally maintained at a zero position by energy supplied thereto from the non-directional antenna.

3. In a right-left indicating direction finding system, a non-directional antenna; a directional antenna; a radio frequency amplifier for each of said antennae; and an electrostatic indicator, said electrostatic indicator comprising a movable part and a stationary part, the stationary part being connected to one of said amplifiers and the movable part to the other of said amplifiers and being in electrostatic relation with each other.

4. In a right-left indicating direction finding system, a non-directional antenna; a directional antenna; a radio frequency amplifier for each of said antennae; and an electromechanical indicator, said electromechanical indicator comprising an unrestrained movable part and a stationary part, the stationary part being connected to one of said amplifiers and the movable part to the other of said amplifiers and being in electromechanical relation with each other, said movable part being normally maintained at a zero position by energy supplied thereto from the non-directional antenna.

5. In a right-left indicating direction finding system, a non-directional antenna; a directional antenna; a radio frequency amplifier for each of said antennae; an indicator having an unrestrained movable part and a stationary part, the stationary part being connected to one of said amplifiers and the movable part being connected to the other of said amplifiers, whereby said indicator is operated by the radio frequency signals of said amplifiers; to indicate the relative values of the signals in said amplifiers when energy is being received from each of said antennae and to maintain said movable member at its zero position when energy is received solely from one of said antennae.

6. In a right-left indicating direction finding system, an electrostatic indicator comprising a rotatable element and a stationary element in electrostatic coupling arrangement with each other; a directional antenna; means for applying signals from said directional antenna on one of said elements; a non-directional antenna; means for applying signals from said non-directional antenna on the other of said elements; the resultant electrostatic field between said elements producing a relative movement therebetween for indicating the relative values of said signals from said antennae.

7. In a right-left indicating direction finding system, an electrostatic indicator comprising a plurality of fixed and unrestrained movable elements arranged circumferentially; a directional antenna, certain of said elements of said electrostatic indicator being connected thereto; and a non-directional antenna, the remaining of said elements being connected to said non-directional antenna.

8. In a right-left indicating direction finding system, an electrostatic indicator comprising four quadrants circumferentially arranged; a rotor portion; a directional antenna; means for applying signals from said directional antenna to certain of said quadrants; a non-directional antenna; and means for applying signals therefrom to the remainder of said quadrants.

9. In a right-left indicating direction finding system, an electrostatic indicator comprising four stationary quadrants circumferentially arranged; a rotor portion comprising two oppositely disposed electrostatic segments conductively connected together and arranged to rotate within and co-act with said quadrants; a directional antenna; means for connecting a pair of oppositely disposed quadrants to said directional antenna; a non-directional antenna; and means for connecting the remaining pair of oppositely disposed quadrants to said non-directional antenna.

10. In a right-left indicating direction finding system, an electrostatic indicator comprising four stationary quadrants circumferentially arranged; a rotor portion comprising two oppositely disposed electrostatic segments conductively connected together and arranged to rotate within and co-act with said quadrant; a directional antenna; means for connecting a pair of oppositely disposed quadrants to said directional antenna; a non-directional antenna; and means for connecting the remaining oppositely disposed quadrants and said rotating segments to said non-directional antenna.

EDWARD J. HEFELE.